(12) United States Patent
Satake et al.

(10) Patent No.: US 6,984,959 B2
(45) Date of Patent: Jan. 10, 2006

(54) WOUND FIELD SYNCHRONOUS MACHINE CONTROL DEVICE

(75) Inventors: Akira Satake, Tokyo (JP); Atsuo Haishi, Tokyo (JP); Masaru Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/042,117

(22) Filed: Jan. 26, 2005

(65) Prior Publication Data
US 2005/0194924 A1  Sep. 8, 2005

(30) Foreign Application Priority Data
Mar. 8, 2004 (JP) .............................. 2004-063723

(51) Int. Cl.
*H02P 5/20* (2006.01)
(52) U.S. Cl. ...................... 318/720; 318/700; 318/704; 318/712
(58) Field of Classification Search ................ 318/700, 318/704, 712, 720
See application file for complete search history.

(56) References Cited

U.S. PATENT DOCUMENTS

| | | | | |
|---|---|---|---|---|
| 4,456,868 A | * | 6/1984 | Yamamura et al. | 318/800 |
| 4,460,860 A | * | 7/1984 | Schwesig et al. | 318/721 |
| 4,509,003 A | * | 4/1985 | Ohnishi et al. | 318/800 |
| 4,677,360 A | * | 6/1987 | Garces | 318/803 |
| 4,926,105 A | * | 5/1990 | Mischenko et al. | 318/800 |
| 6,118,247 A | | 9/2000 | Obayashi et al. | 318/712 |

FOREIGN PATENT DOCUMENTS

JP  8-331900 A  12/1996
JP  11-313498 A  11/1999

OTHER PUBLICATIONS

"High-performance Variable Speed Control of Synchronous Motor", Hiroshi Osawa, et al., The Transactions of the Institute of Electrical Engineers of Japan on Industry Applications, vol. 107-D, No. 2, Feb. 1987, pp. 175-182.

* cited by examiner

Primary Examiner—Rita Leykin
(74) Attorney, Agent, or Firm—Sughrue Mion, PLLC

(57) ABSTRACT

A synchronous machine control device includes a flux command generator, a magnetic flux estimator, a divider, a flux controller and γ- and δ-axis armature current controllers. The flux command generator produces a flux command from the synchronous machine turning speed. The magnetic flux estimator calculates the magnitude and phase of armature flux linkage from armature currents and field current taking into consideration magnetic fluxes produced by permanent magnets. The divider produces an armature current command by dividing a torque command by the armature flux linkage. The flux controller determines a field current command based on an error of the magnitude of the armature flux linkage from the flux command. The γ- and δ-axis armature current controllers control the synchronous machine such that both an error of an armature current in a direction perpendicular to the armature flux linkage direction from the armature current command and an armature current in the armature flux linkage direction become zeros.

5 Claims, 5 Drawing Sheets

WOUND FIELD SYNCHRONOUS MACHINE CONTROL DEVICE

BACKGROUND OF THE INVENTION

1. Field of the Invention

The present invention relates generally to a control device for a wound field synchronous machine which generates magnetic fields by field windings of a rotor and, more particularly, to a control device for a wound field synchronous machine which generates magnetic fields by a combination of field windings of a rotor and permanent magnets.

2. Description of the Background Art

Conventionally, a vector control method is used as a high-efficiency, high-power-factor control method for controlling a wound field synchronous machine (which will occasionally be referred to simply as the synchronous machine hereinafter) in such a manner that armature flux linkage and armature current are perpendicular to each other as shown in a paper titled "High-performance Variable Speed Control of Synchronous Machine" written by Hiroshi Osawa, et al. published in The Transactions of the Institute of Electrical Engineers of Japan on Industry Applications, Volume 107-D, No. 2, pages 175–182, February 1987, for instance. A synchronous machine using permanent magnets together with field windings, however, can not employ the conventional vector control method as it is necessary to take into consideration the influence of magnetic fluxes produced by the permanent magnets.

There has been a conventional approach to the solution of the aforementioned problem as shown in Japanese Laid-open Patent Application No. 1996-331900, for example, in which a control device determines, from a torque command given to the control device and turning speed of a synchronous machine, an armature current command value for a field flux direction (d-axis), an armature current command value for a direction (q-axis) perpendicular to the d-axis and a field flux command value referring to a table such that maximum efficiency is achieved under current operating conditions of the synchronous machine. Individual data values stored in such a table are calculated by using characteristic parameters of the synchronous machine to be controlled. A similar approach to the problem is also shown in Japanese Laid-open Patent Application No. 1999-313498, in which a field current command is determined instead of a field flux command from a table.

The conventional synchronous machine control device structured as mentioned above determines a d-axis current, a q-axis current, and the values of field-generating commands, such as the field flux command or the field current command, referring to the table. While the individual data values stored in the table are calculated by using the characteristic parameters of the synchronous machine to be controlled, this process is complicated and necessitates repetitive calculations. For this reason, these data values are calculated off-line and stored in the table in advance. The conventional control device makes it possible to perform maximum torque controlled operation with any armature current, for instance, to obtain a maximum torque in response to the torque command given by generating individual current commands referring to the table produced as explained above.

In actual production lines, however, it is fairly difficult to manufacture synchronous machines having perfectly the same characteristic parameters, which include inductance and permanent magnet fluxes, for instance, even if the synchronous machines are of the same model. Accordingly, there inevitably occur differences in the values of the characteristic parameters among the individual synchronous machines due to variations in their production. According to the aforementioned conventional control method, it is necessary to produce data values to be stored in the table for the individual synchronous machines when the values of the characteristic parameters differ from one synchronous machine to another, and this entails great deal of work load. Additionally, the synchronous machine and the control device are usually shipped separately, and not as a preadjusted set, and the synchronous machine and the control device are joined and run together at a customer's site, making it necessary to store the data values of the table appropriate for each particular synchronous machine in the control device.

According to the conventional control method, it is necessary to store d-axis currents, q-axis currents and field flux command values for different combinations of torque commands and machine turning speeds in the table. This means that an extraordinarily large amount of data must be registered and this procedure can not be easily done and renders the vector control method impracticable.

SUMMARY OF THE INVENTION

The present invention intended to solve the aforementioned problems of the prior art has as an object the provision of a control device for a wound field synchronous machine which can easily realize optimum control of the synchronous machine even when characteristic parameters of the synchronous machine vary, by properly compensating for variations in the characteristic parameters.

In one form of the invention, a control device for controlling a wound field synchronous machine having a field coil and permanent magnets for generating magnetic fields includes a flux command generator, an armature flux linkage calculator, a divider, a field current command calculator and an armature current controller. The flux command generator produces a flux command based on an input turning speed of the synchronous machine. The armature flux linkage calculator calculates the magnitude and phase of armature flux linkage and power angle from the values of armature currents and field current flowing in the synchronous machine taking into consideration magnetic fluxes produced by the permanent magnets. The divider produces an armature current command by dividing a torque command by the armature flux linkage. The field current command calculator calculates a field current command based on an error of the armature flux linkage calculated by the armature flux linkage calculator from the flux command and the power angle. The armature current controller controls the synchronous machine in such a way that both an error of an armature current in a direction perpendicular to the direction of the armature flux linkage from the armature current command and an armature current in the direction of the armature flux linkage become zeros.

The control device thus structured can control the wound field synchronous machine under optimum conditions reflecting changes in machine characteristics with ease even when any of the characteristic parameters of the wound field synchronous machine vary.

In another form of the invention, a control device for controlling a wound field synchronous machine having a field coil and permanent magnets for generating magnetic fields includes a flux command generator, a divider, a power angle calculator, a field current command generator, an adder and an armature current controller. The flux command generator produces a flux command based on an input turning speed of the synchronous machine. The divider produces an armature current command by dividing a torque command by the value of the flux command. The power angle calculator calculates power angle from the flux command and the armature current command. The field current command generator calculates a field current command from the flux command and the power angle taking into consideration magnetic fluxes produced by the permanent magnets. The adder calculates the phase of the flux command by adding the power angle to rotor phase. The armature current controller controls the synchronous machine in such a way that both an error of an armature current in a direction perpendicular to the direction of the flux command from the armature current command and an armature current in the direction of the armature flux linkage become zeros.

The control device thus structured can also control the wound field synchronous machine under optimum conditions reflecting changes in machine characteristics with ease even when any of the characteristic parameters of the wound field synchronous machine vary. To add, this control device can perform simplified control operation by means of the power angle calculator and the field current command generator without estimating or controlling formation of the magnetic fluxes, so that the control device can be structured with a simpler configuration.

These and other objects, features and advantages of the invention will become more apparent upon reading the following detailed description along with the accompanying drawings.

DETAILED DESCRIPTION OF THE PREFERRED EMBODIMENTS OF THE INVENTION

First Embodiment

Figure 1:
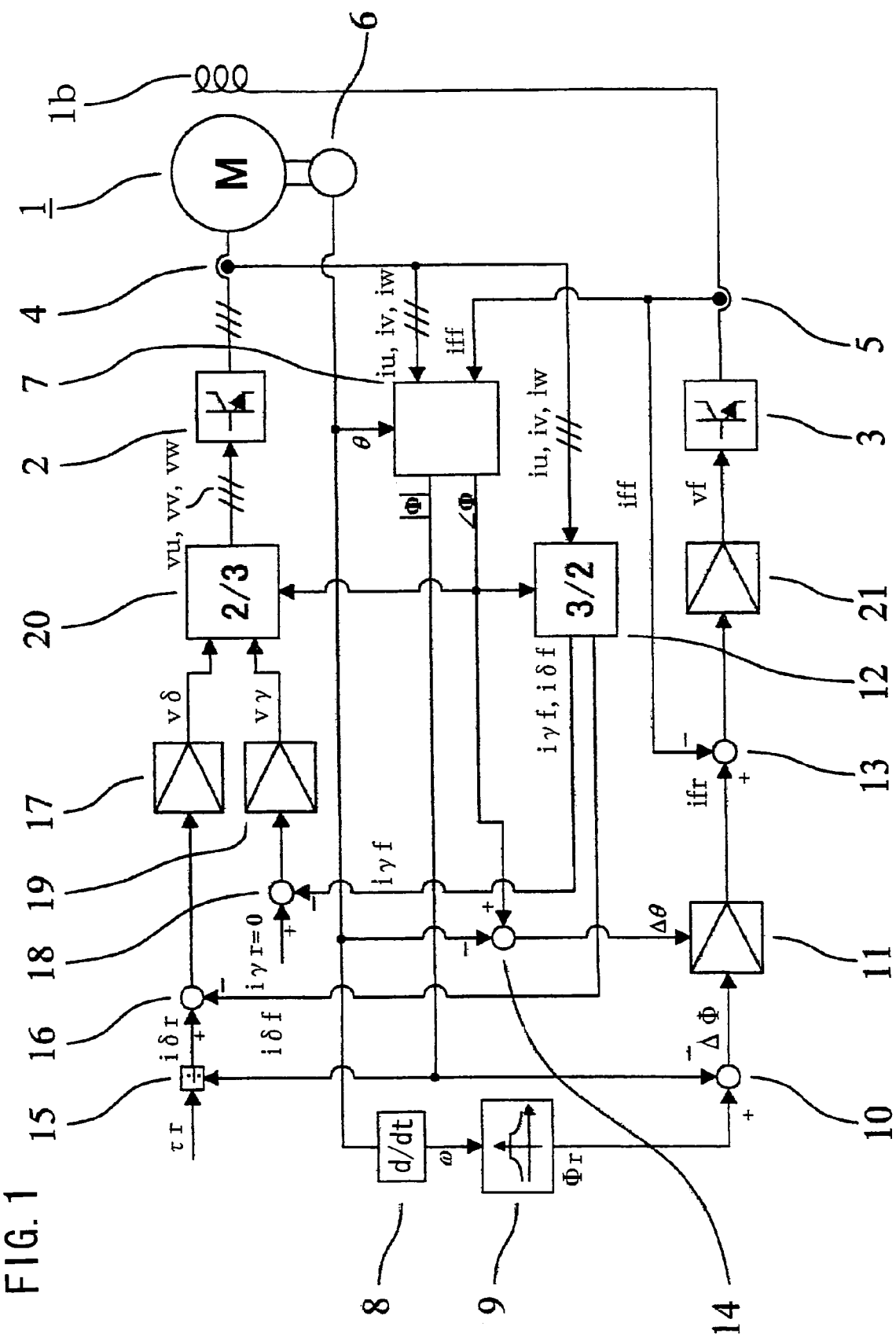
FIG. 1 is a block diagram showing the configuration of a control device for a synchronous machine according to a first embodiment of the invention.
Figure 2:
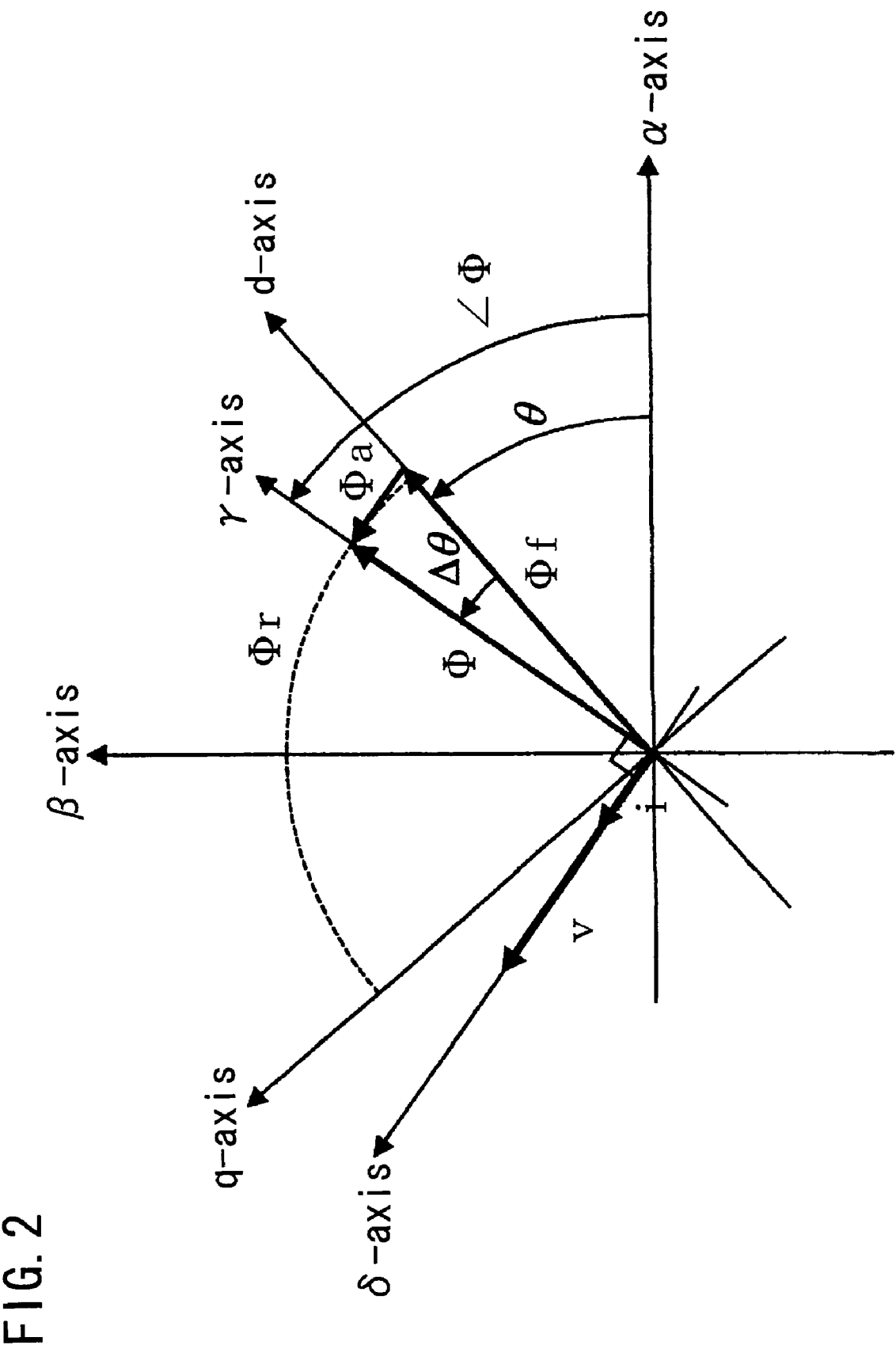
FIG. 2 is a vector diagram illustrating the operation of the synchronous machine for explaining the control device of FIG. 1.
Figure 3:
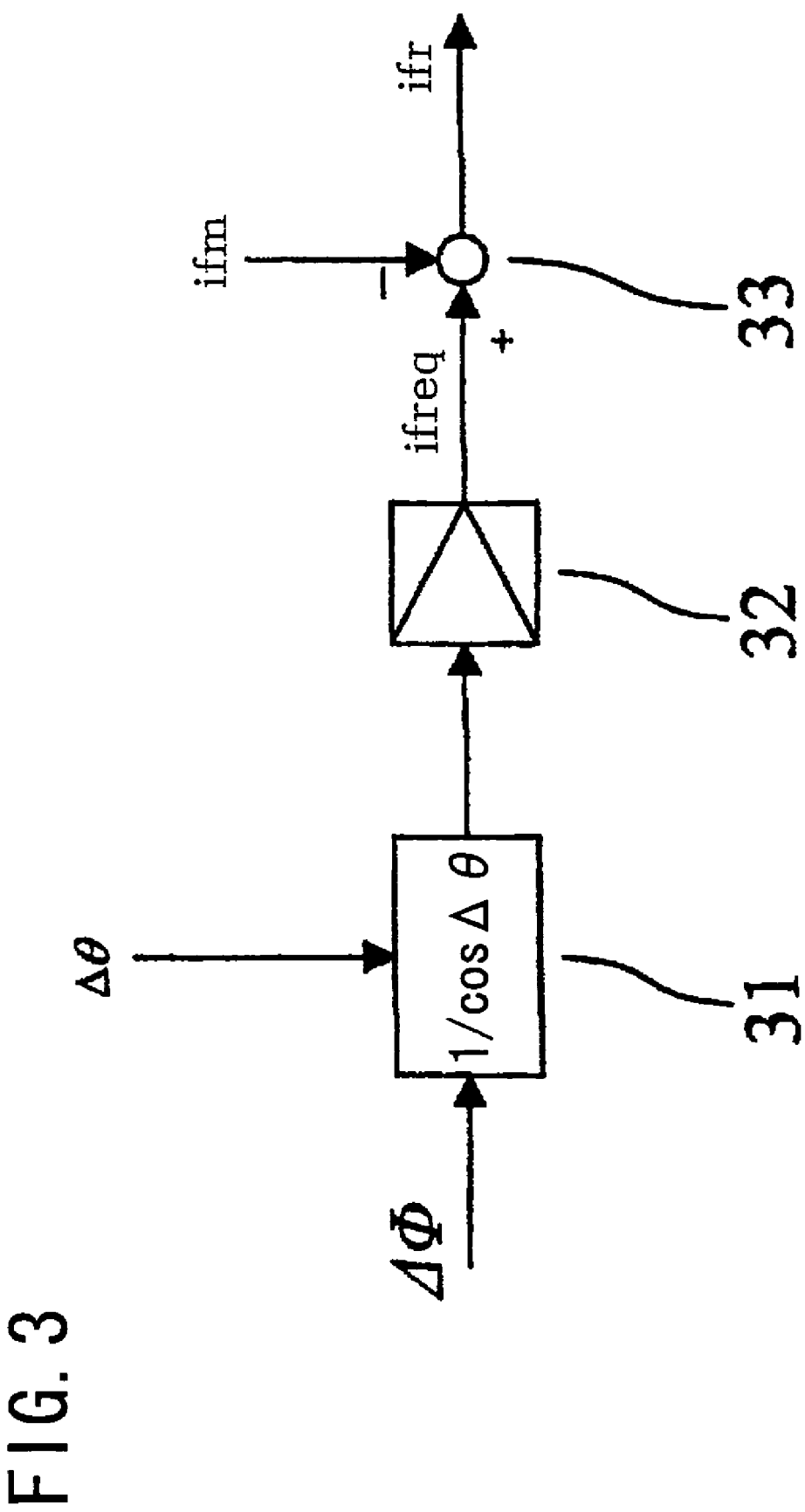
FIG. 3 is a block diagram specifically showing the configuration of a flux controller of the control device of FIG. 1.

FIGS. 1 to 3 are diagrams showing a first embodiment of the invention, in which FIG. 1 is a block diagram showing the configuration of a control device for a synchronous machine 1 according to the first embodiment of the invention, FIG. 2 is a vector diagram illustrating the operation of the synchronous machine 1 for explaining a control system of FIG. 1, and FIG. 3 is a block diagram specifically showing the configuration of a flux controller 11 of the control device of FIG. 1.

Referring to FIG. 1, the synchronous machine 1 includes a field coil 1b, permanent magnets (not shown) for generating magnetic fields. Armature coils (not shown) of the synchronous machine 1 are connected to a three-phase drive circuit 2 and the field coil 1b is connected to and driven by a direct current (dc) drive circuit 3. Currents flowing through the armature coils and the field coil 1b are detected by an armature current sensor 4 and a field current sensor 5, respectively.

Rotor phase θ is detected by an armature position sensor 6. A magnetic flux estimator 7 calculates the absolute value (magnitude) |Φ| of armature flux linkage and phase ∠Φ thereof from armature currents iu, iv, iw, field current iff and the rotor phase θ as will be later discussed in detail. In the synchronous machine control device of this embodiment, the armature currents iu, iv, iw are controlled on two axes, that is, a γ-axis in the phase ∠Φ direction of the armature flux linkage and a δ-axis perpendicular to the γ-axis. Accordingly, the armature currents iu, iv, iw are coordinate-converted into γ- and δ-axis armature currents iγf, iδf by a coordinate converter 12. An adder 14 determines power angle Δθ by subtracting the rotor phase θ from the phase ∠Φ of the armature flux linkage.

The rotor phase θ is differentiated by a differentiator 8 to obtain rotor speed ω and a flux command generator 9 produces a flux command Φr from the rotor speed ω. An adder 10 determines an error ΔΦ by subtracting the armature flux linkage |Φ| from the flux command Φr. The error ΔΦ is input into the flux controller 11 which calculates a field current command ifr referring to the power angle Δθ and magnetic fluxes produced by the permanent magnets as will be later discussed in detail.

On the other hand, a divider 15 divides a torque command τr by the armature flux linkage |Φ| to produce a δ-axis current command iδr. An adder 16 determines a δ-axis current error Δiδ by subtracting the δ-axis armature current iδf from the δ-axis current command iδr and delivers the δ-axis current error Δiδ to a δ-axis current controller 17 which outputs a δ-axis voltage command vδ. While a γ-axis current command iγr is 0, an adder 18 similarly calculates a γ-axis current error Δiγ by subtracting the γ-axis armature current iγf from the γ-axis current command iγr and delivers the γ-axis current error Δiγ to a γ-axis current controller 19 which outputs a γ-axis voltage command vγ.

A coordinate converter 20 converts the γ- and δ-axis voltage commands vγ, vδ into three-phase voltages vu, vv, vw which are input into the three-phase drive circuit 2. An adder 13 determines a field current error Δif by subtracting the field current iff from the field current command ifr and delivers the field current error Δif to a field current controller 21 which calculates a field voltage command vf to be input into the dc drive circuit 3.

Now, operation of the control device of FIG. 1 is explained referring to the vector diagram of FIG. 2. As illustrated in FIG. 2, d- and q-axes fixed to a rotor represent the rotor phase θ with respect to an α-β coordinate system fixed to an armature. A field flux vector Φf occurs in a d-axis direction and a flux represented by the field flux vector Φf is a combination of a permanent magnet flux Φm and a flux produced by the field current iff. This relationship is expressed by equation (1) below:

$$\Phi f = \Phi m + M \cdot iff \tag{1}$$

where M is a mutual inductance induced by the field current iff to d-axis armature flux linkage.

On the other hand, an armature reaction flux vector Φa occurs due to an armature current vector i. A combination of the aforementioned field flux vector Φf and the armature reaction flux vector Φa is a total armature flux linkage vector Φ of which absolute value |Φ| and phase ∠Φ can be obtained from equations (2), (3) and (4) below:

$$|\Phi| = \sqrt{(\Phi f + Ld \cdot id)^2 + (Lq \cdot iq)^2} \quad (2)$$

$$\Delta\theta = \tan^{-1}\{Lq \cdot iq/(\Phi f + Ld \cdot id)\} \quad (3)$$

$$\angle\Phi = \theta + \Delta\theta \quad (4)$$

where Ld is d-axis self-inductance and Lq is q-axis self-inductance of the armature. Mathematical operation expressed by equations (2), (3) and (4) is executed by the magnetic flux estimator 7.

The γ-axis is taken in the direction of the phase ∠Φ of the armature flux linkage and the δ-axis is taken in the direction perpendicular to the γ-axis. A armature current needed for generating a given torque is minimized under conditions where the armature current vector i is perpendicular to the total armature flux linkage Φ. Therefore, it is possible to perform maximum torque controlled operation with the armature current vector i to obtain a maximum torque by dividing the torque command τr by the armature flux linkage |Φ| with the divider 15 to give the δ-axis current command iδr and making the γ-axis current command iγr equal to 0 so that the armature current vector has only a δ-axis component.

The magnetic flux estimator 7 and the adder 14 of the present embodiment together constitute an armature flux linkage calculator of this invention, the flux controller 11 constitutes a field current command calculator, and the δ-axis current controller 17, the adder 18 and the γ-axis current controller 19 together constitute an armature current controller.

Now, the flux controller 11 is described in further detail. While an ordinary proportional-plus-integral (PI) controller is used as a flux controller in vector control of an ordinary wound field synchronous motor, it is necessary to take into consideration the influence of the magnetic fluxes produced by permanent magnets in a wound field synchronous motor additionally using the permanent magnets as shown by the aforementioned equation (1). Referring to FIG. 3 showing the internal configuration of the flux controller 11, a compensator 31 calculates a d-axis component of the flux error ΔΦ by using the power angle Δθ and outputs the result to a PI controller 32. The PI controller 32 produces a d-axis field current command equivalent ifreq from which an adder 33 subtracts a permanent magnet equivalent field current ifm to reflect the influence of the magnetic fluxes produced by the permanent magnets, whereby the field current command ifr is finally obtained (ifr=ifreq−ifm), where the permanent magnet equivalent field current ifm is given by equation (5) below:

$$ifm = \Phi m/M \quad (5)$$

The aforementioned configuration of the flux controller 11 makes it possible to calculate the field current command value taking into consideration the influence of the magnetic fluxes produced by the permanent magnets. Disregarding an ohmic voltage drop caused by the armature current, the armature voltage is given by a product of the absolute value |Φ| of the total armature flux linkage vector Φ and machine turning speed. Therefore, if the product of the absolute value |Φ| of the total armature flux linkage vector Φ and the machine turning speed is kept at a constant value, the armature voltage can be held constant, and even if there are limitations in output voltages of the three-phase drive circuit 2, it is possible to maintain proper output voltages. Using the aforementioned relationship, the flux command generator 9 calculates the flux command Φr from the rotor speed ω.

In the aforementioned vector control operation of the embodiment, the control device uses only the permanent magnet flux Φm, the mutual inductance M induced by the field current iff to the d-axis armature flux linkage, and the self-inductances Ld, Lq of the armature as characteristic parameters of the synchronous machine 1 for computation. Therefore, it is possible to realize optimum operation of the synchronous machine 1 by just changing the values of these characteristic parameters even if the characteristic parameters differ from one synchronous machine to another. Additionally, even when the permanent magnet flux Φm varies due to temperature increase as discussed in Japanese Laid-open Patent Application No. 1996-331900, it is possible to instantly shift to an operating state reflecting a change in machine characteristics by simply altering the value of the permanent magnet flux Φm during execution of the vector control operation.

The aforementioned characteristic parameters of the synchronous machine 1 can be measured by the control device itself. Therefore, it is possible to run each particular synchronous machine 1 under optimum conditions by operating the control device using the characteristic parameters measured by the control device itself. A typical method of measuring the characteristic parameters is now described in the following.

Equation (6) below is a voltage equation applicable to a wound field synchronous motor additionally using permanent magnets under steady-state operating conditions. The method of measuring the individual characteristic parameters of the synchronous machine 1 is explained by using this equation (6). Since coordinate conversion is performed by using the rotor phase θ in measuring constants of a synchronous machine, such as permanent magnet-related constants, the γ- and δ-axes correspond to the d- and q-axes of FIG. 1, respectively.

$$\begin{bmatrix} vd \\ vq \end{bmatrix} = \begin{bmatrix} R & -\omega Lq \\ \omega Ld & R \end{bmatrix} \begin{bmatrix} id \\ iq \end{bmatrix} + \omega \begin{bmatrix} 0 \\ \phi m + M \cdot if \end{bmatrix} \quad (6)$$

Substituting zeros (0) for d- and q-axis armature currents id, iq and field current if in equation (6) and modifying the second row of the matrices of equation (6), the permanent magnet flux Φm is expressed by equation (7) below:

$$\Phi m = vq/\omega \quad (7)$$

It is recognized from above that the permanent magnet flux Φm can be calculated from equation (7) if d- and q-axis armature current commands (i.e., the γ- and δ-axis current commands iγr, iδr) and the field current command ifr are zeroed and q-axis voltage command (i.e., the δ-axis voltage command vδ output from the δ-axis current controller 17 of FIG. 1) is registered while the synchronous machine 1 is run by an external power source.

Substituting zeros (0) for the field current if and the q-axis armature current iq and setting the d-axis armature current id to a specific value in equation (6) and modifying the second row of the matrices of equation (6), the d-axis self-inductance Ld is expressed by equation (8) below:

$$Ld = (vq - \omega \cdot \Phi m)/\omega \cdot id \quad (8)$$

It is recognized from above that the d-axis self-inductance Ld can be calculated from equation (8) if the q-axis armature current command and the field current command ifr are zeroed, the d-axis armature current command is set to a specific value and q-axis voltage command is registered while the synchronous machine 1 is run by the external power source.

Also, substituting zeros (0) for the field current if and the d-axis armature current id and setting the q-axis armature current iq to a specific value in equation (6) and modifying the first row of the matrices of equation (6), the q-axis self-inductance Lq is expressed by equation (9) below:

$$Lq = vd/\omega \cdot iq \tag{9}$$

It is recognized from above that the q-axis self-inductance Lq can be calculated from equation (9) if the d-axis armature current command and the field current command ifr are zeroed, the q-axis armature current command is set to a specific value and d-axis voltage command is registered while the synchronous machine 1 is run by the external power source.

Finally, substituting zeros (0) for the d- and q-axis armature currents id, iq and setting the field current if to a specific value in equation (6) and modifying the second row of the matrices of equation (6), the mutual inductance M is expressed by equation (10) below:

$$M = (vq - \omega \cdot \Phi m)/\omega \cdot if \tag{10}$$

It is recognized from above that the mutual inductance M can be calculated from equation (10) if the d- and q-axis armature current commands are zeroed, the field current command ifr is set to a specific value and q-axis voltage command is registered while the synchronous machine 1 is run by the external power source.

If the control device itself measures and updates the characteristic parameters of the synchronous machine 1 at a proper time before or during operation of the synchronous machine 1 by using the aforementioned measurement method, it is possible to run the synchronous machine 1 under optimum operating conditions even if the characteristic parameters differ from one synchronous machine to another or the characteristic parameters of a particular machine fluctuates. Besides the aforementioned measurement method, there exist alternative measurement methods which are known to exert the same advantageous effects as the measurement method of the invention, such as a method of determining inductances from alternating currents (ac) induced in individual windings by applying ac voltages to the armature and field windings.

It is known that the aforementioned characteristic parameters of the synchronous machine vary as a result of magnetic saturation. For example, there is a case where the mutual inductance M and the q-axis self-inductance Lq are considerably affected by the field current if and the q-axis armature current iq, respectively, due to magnetic saturation. An approach to controlling the synchronous machine 1 in consideration of the influence of magnetic saturation is to vary the values of the characteristic parameters according to operating conditions (e.g., individual current values or command values) by using a characteristics table or a characteristics formula. This approach would make it possible to control the synchronous machine 1 reflecting changes in the characteristic parameters due to variations in operating conditions.

While the control device of the present embodiment has so far been described as employing a process of estimating formation of magnetic fluxes from the individual currents iu, iv, iw, iff in the magnetic flux estimator 7, a process employing a flux observer capable of improving the accuracy of flux estimation by additionally using voltage information may be used instead.

In the aforementioned control device of the embodiment, the magnetic flux estimator 7 calculates the magnitude $|\Phi|$ of the armature flux linkage and the phase $\angle \Phi$ thereof from the $\gamma$- and $\delta$-axis armature currents i$\gamma$f, i$\delta$f, the field current iff and the rotor phase $\theta$. Alternatively, it is also possible to calculate the magnitude $|\Phi|$ of the armature flux linkage and the phase $\angle \Phi$ thereof by using the values of the d- and q-axis armature current commands (i.e., the $\gamma$- and $\delta$-axis current commands i$\gamma$r, i$\delta$r) and the field current command ifr instead of the actually measured $\gamma$- and $\delta$-axis armature currents i$\gamma$f, i$\delta$f and field current iff. In this alternative approach, the magnitude $|\Phi|$ of the armature flux linkage is required for calculating the value of the $\delta$-axis armature current command i$\delta$r and the phase $\angle \Phi$ of the armature flux linkage is required for calculating the three-phase armature currents iu, iv, iw from the $\gamma$- and $\delta$-axis armature current commands i$\gamma$r, i$\delta$r as discussed above, so that part of calculation becomes a cyclical process.

To avoid this cyclical process, the control device is configured as follows, for instance. By executing the aforementioned process of computation at specific intervals by a microprocessor, the control device calculates the individual current commands i$\gamma$r, i$\delta$r, ifr by using results of a preceding computation cycle as the values of the magnitude $|\Phi|$ of the armature flux linkage and the phase $\angle \Phi$ thereof. Then, using the values of the current commands i$\gamma$r, i$\delta$r, ifr, the control device calculates the magnitude $|\Phi|$ of the armature flux linkage and the phase $\angle \Phi$ thereof and uses the values thus obtained in a succeeding computation cycle. Immediately after power-on when the values of the d- and q-axis armature current commands and the field current command ifr are all zeros, the control device begins the control operation after initializing the values of the magnitude $|\Phi|$ of the armature flux linkage and the phase $\angle \Phi$ thereof to the values of the permanent magnet flux $\Phi$m and the phase $\angle \Phi$, respectively, at the current rotor phase $\theta$, for example. Additionally, if the control device is so configured as to process the values of the magnitude $|\Phi|$ of the armature flux linkage and the phase $\angle \Phi$ thereof thus obtained by a filter having specific properties and use the processed values in the succeeding computation cycle in executing the aforementioned computation process, it is possible to achieve enhanced computational stability. Since the control device uses the values of the current commands i$\gamma$r, i$\delta$r, ifr for estimating the formation of magnetic fluxes as discussed above, the control device can control the synchronous machine 1 in a more stable fashion without being affected by noise generated as a result of current detection.

Second Embodiment

Figure 4:
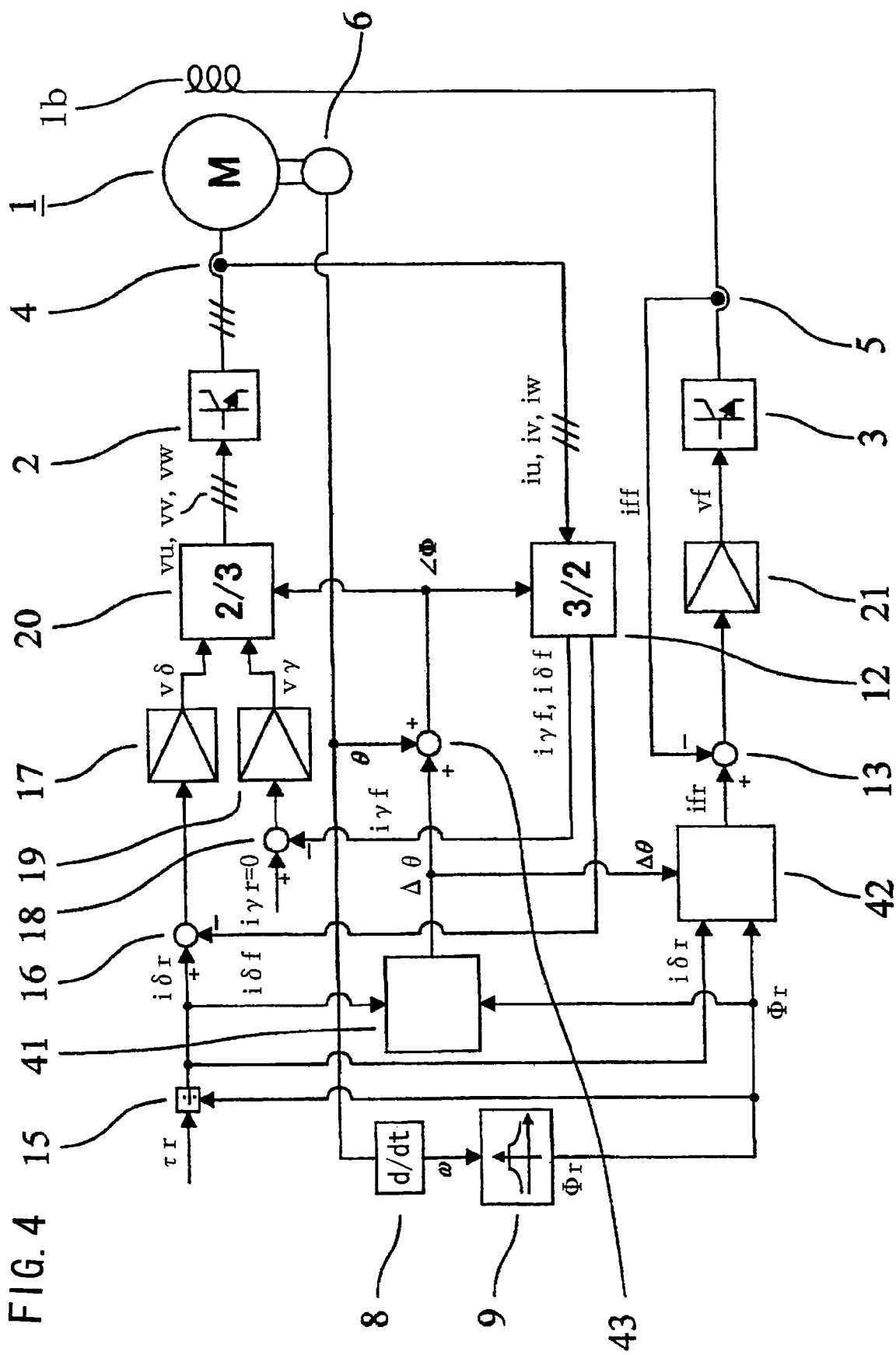
FIG. 4 is a block diagram showing the configuration of a control device for a synchronous machine according to a second embodiment of the invention.
Figure 5:
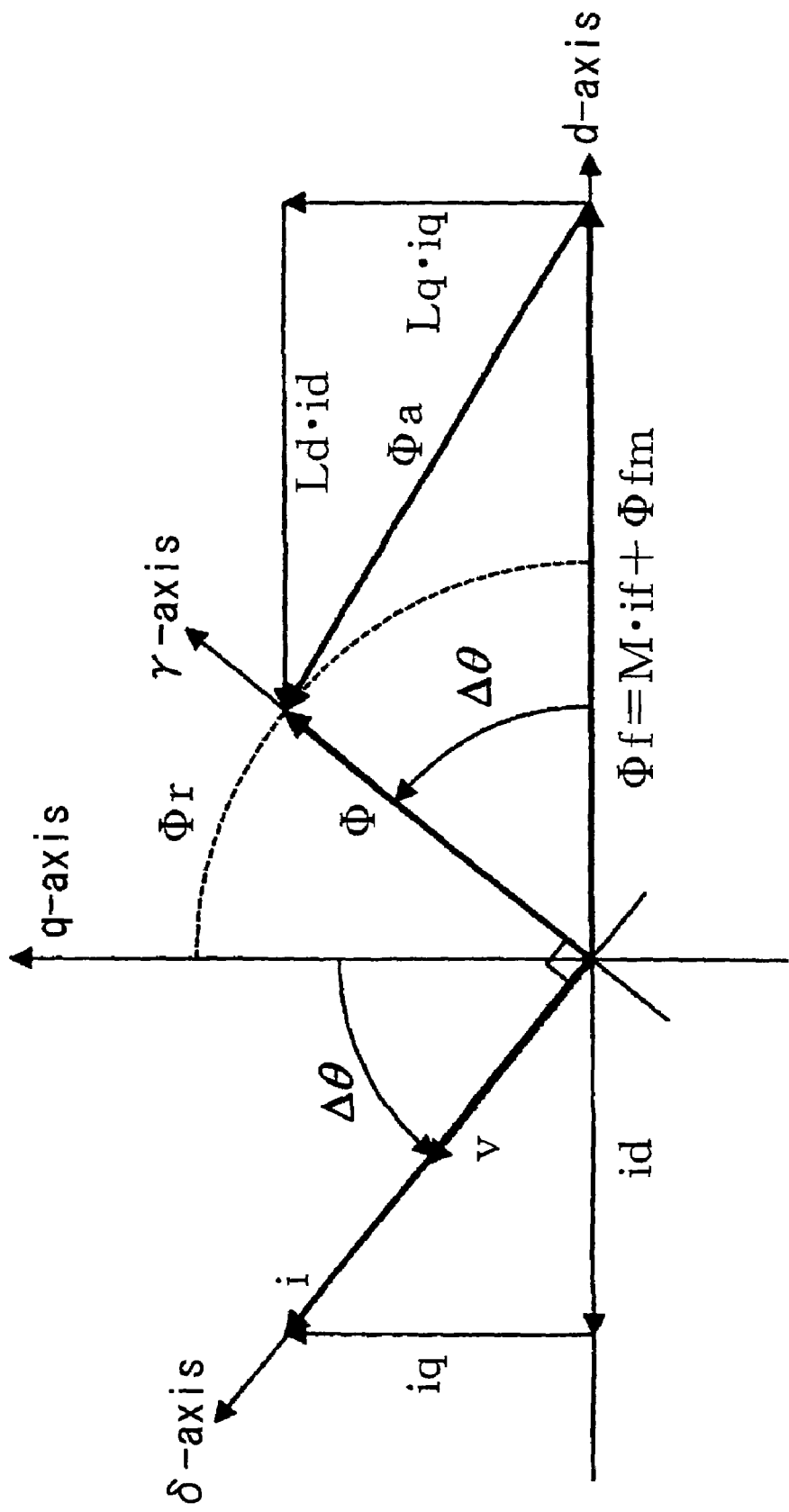
FIG. 5 is a vector diagram illustrating a situation of the control device in which armature flux linkage and armature current are perpendicular to each other.

FIGS. 4 and 5 are diagrams showing a second embodiment of the invention, in which FIG. 4 is a block diagram showing the configuration of a control device for a synchronous machine 1 according to the second embodiment of the invention, and FIG. 5 is a vector diagram illustrating a situation of the control device in which armature flux linkage and armature current are perpendicular to each other.

Referring to FIG. 4, the control device includes, instead of the magnetic flux estimator 7 of FIG. 1, a power angle calculator 41 for calculating the power angle $\Delta\theta$ from the flux command $\Phi$r and the $\delta$-axis current command i$\delta$r. The control device also includes, instead of the flux controller 11 of FIG. 1, a field current command generator 42 for calculating the field current command ifr from the flux command Φr and the power angle Δθ. Unlike the control device of the first embodiment, the control device of this embodiment does not perform any feedback control of magnetic fluxes using the estimated magnetic fluxes. An adder 43 calculates the phase ∠Φ of the armature flux linkage by adding the power angle Δθ to the rotor phase θ and the control device controls the armature currents on the γ-axis in the phase ∠Φ direction and the δ-axis perpendicular to the γ-axis in the γ-δ coordinate system. The control device of this embodiment has otherwise the same configuration as the control device of the first embodiment shown in FIG. 1, so that elements identical or similar to those of the first embodiment are designated by the same reference numerals and these elements are not described here.

The synchronous machine control device of this embodiment calculates the power angle Δθ on the assumption that the armature flux linkage and armature current are perpendicular to each other. FIG. 5 is the vector diagram illustrating the situation in which the total armature flux linkage vector Φ is perpendicular to the armature current vector i. It is seen from FIG. 5 that the power angle Δθ is given by equation (11) below:

$$\Delta\theta = \tan^{-1}(Lq \cdot iq/\Phi\cos\Delta\theta) \quad (11)$$
$$= \tan^{-1}(Lq \cdot i\delta\cos\Delta\theta/\Phi\cos\Delta\theta)$$
$$= \tan^{-1}(Lq \cdot i\delta/\Phi)$$

It is possible to calculate the power angle Δθ from equation (11) by using the δ-axis armature current command iδr and the flux command Φr instead of the δ-axis armature current iδf and the total armature flux linkage vector Φ, respectively. The power angle calculator 41 calculates the power angle Δθ by this method. This calculation method makes it possible to significantly simplify calculation of the power angle Δθ compared to the method of the first embodiment employing the magnetic flux estimator 7. As an alternative, the power angle Δθ can be calculated by using the δ-axis armature current iδf which is a feedback value instead of the δ-axis armature current command iδr.

As already mentioned, the synchronous machine control device of this embodiment does not perform any feedback control of magnetic fluxes using the estimated magnetic fluxes. It is recognized from FIG. 5 that the d-axis field flux vector Φf is given by equation (12) below:

$$\Phi f = \Phi\cos\Delta\theta - Lq \cdot id \quad (12)$$
$$= \Phi\cos\Delta\theta + Lq \cdot i\delta\sin\Delta\theta$$

Substituting equations (1) and (5) into equation (12), the relationship expressed by equation (12) can be rewritten as shown in equation (13) below:

$$if=(\Phi \cos \Delta\theta + Lq \cdot i\delta \sin \Delta\theta)/M - ifm \quad (13)$$

The field current command generator 42 calculates the field current command ifr from equation (13) by using the δ-axis current command iδr and the flux command Φr instead of the δ-axis armature current iδf and the total armature flux linkage vector Φ, respectively.

In a case where the self-inductances of the armature are produced by non-salient poles (Ld=Lq), the total armature flux linkage vector Φ and the armature reaction flux vector Φa are perpendicular to each other, so that there is a relationship expressed by equation (14) below:

$$\Phi f = \Phi/\cos \Delta\theta \quad (14)$$

Substituting equations (1) and (5) into equation (14), the relationship expressed by equation (14) can be rewritten as shown in equation (15) below:

$$if=\Phi/M \cos \Delta\theta - ifm \quad (15)$$

Thus, the field current command generator 42 can calculate the field current command ifr from equation (15) when the self-inductances of the armature are produced by non-salient poles (Ld=Lq). In this case, the field current command generator 42 can further simplify the calculation as there is no need to refer to the value of the δ-axis armature current command iδr.

Like the control device of the first embodiment, the control device of the second embodiment can control the synchronous machine 1 by instantly reflecting changes in the characteristic parameters of the synchronous machine 1 by measuring the characteristic parameters while the synchronous machine 1 is under operating conditions. Also, as discussed earlier with reference to the first embodiment, a characteristics table or a characteristics formula may be used to vary the values of the characteristic parameters according to operating conditions (e.g., individual current values or command values) to cope with the aforementioned phenomenon that the values of the characteristic parameters of the synchronous machine 1 fluctuate due to the influence of magnetic saturation.

While the foregoing discussion of the second embodiment has illustrated the method of simplifying the calculation of the power angle Δθ and field flux control operation, the control device of the second embodiment may be reconfigured such that the phase of the armature flux linkage is calculated by the method of the first embodiment and the field current command ifr for controlling the armature flux linkage is calculated by the simplified method of the second embodiment in which the field current command generator 42 calculates the field current command ifr from the flux command Φr and the power angle Δθ.

The power angle calculator 41 and the field current command generator 42 of the present embodiment constitute a power angle calculator and a field current command generator of this invention, respectively.

As thus far discussed, the aforementioned control device of the invention controls the synchronous machine in such a manner that the synchronous machine is maintained in an optimum operating state by using the characteristic parameters of the machine including information on the magnetic fluxes produced by the permanent magnets. Therefore, even when any of the characteristic parameters of the synchronous machine vary, it is possible to maintain the synchronous machine in the optimum operating state reflecting variations in machine characteristics by slightly altering the values of the characteristic parameters. Also, the control device according to the second embodiment of the invention is structured to perform simplified control operation without the need to estimate or control formation of the magnetic fluxes, so that the control device of the second embodiment can exert the same advantageous effects as the control device of the first embodiment with a simpler configuration.

To summarize, a control device in one form of the invention for controlling a wound field synchronous machine having a field coil and permanent magnets for generating magnetic fields includes a flux command generator, an armature flux linkage calculator, a divider, a field current command calculator and an armature current controller. The flux command generator produces a flux command based on an input turning speed of the synchronous machine. The armature flux linkage calculator calculates the magnitude and phase of armature flux linkage and power angle from the values of armature currents and field current flowing in the synchronous machine taking into consideration magnetic fluxes produced by the permanent magnets. The divider produces an armature current command by dividing a torque command by the armature flux linkage. The field current command calculator calculates a field current command based on an error of the armature flux linkage calculated by the armature flux linkage calculator from the flux command and the power angle. The armature current controller controls the synchronous machine in such a way that both an error of an armature current in a direction perpendicular to the direction of the armature flux linkage from the armature current command and an armature current in the direction of the armature flux linkage become zeros.

The control device thus structured can control the wound field synchronous machine under optimum conditions reflecting changes in machine characteristics with ease even when any of the characteristic parameters of the wound field synchronous machine vary.

In one feature of the invention, the armature flux linkage calculator calculates the magnitude and phase of the armature flux linkage based on characteristics of each particular wound field synchronous machine, and the field current command calculator calculates the field current command based on the characteristics of each particular wound field synchronous machine.

The control device thus structured can properly control the wound field synchronous machine according to the characteristics thereof even if the characteristics differ from one wound field synchronous machine to another.

In another form of the invention, a control device for controlling a wound field synchronous machine having a field coil and permanent magnets for generating magnetic fields includes a flux command generator, a divider, a power angle calculator, a field current command generator, an adder and an armature current controller. The flux command generator produces a flux command based on an input turning speed of the synchronous machine. The divider produces an armature current command by dividing a torque command by the value of the flux command. The power angle calculator calculates power angle from the flux command and the armature current command. The field current command generator calculates a field current command from the flux command and the power angle taking into consideration magnetic fluxes produced by the permanent magnets. The adder calculates the phase of the flux command by adding the power angle to rotor phase. The armature current controller controls the synchronous machine in such a way that both an error of an armature current in a direction perpendicular to the direction of the flux command from the armature current command and an armature current in the direction of the armature flux linkage become zeros.

The control device thus structured can also control the wound field synchronous machine under optimum conditions reflecting changes in machine characteristics with ease even when any of the characteristics of the wound field synchronous machine vary. To add, this control device can perform simplified control operation by means of the power angle calculator and the field current command generator without estimating or controlling formation of the magnetic fluxes, so that the control device can be structured with a simpler configuration.

In another feature of the invention, the power angle calculator calculates the power angle based on characteristics of each particular wound field synchronous machine, and the field current command generator calculates the field current command based on the characteristics of each particular wound field synchronous machine.

According to this feature of the invention, the control device can properly control the wound field synchronous machine according to the characteristics thereof even if the characteristics differ from one wound field synchronous machine to another.

In still another form of the invention, a control device for controlling a wound field synchronous machine having a field coil and permanent magnets for generating magnetic fields includes a flux command generator, an armature flux linkage calculator, a divider, a field current command generator and an armature current controller. The flux command generator produces a flux command based on an input turning speed of the synchronous machine. The armature flux linkage calculator calculates the magnitude and phase of armature flux linkage and power angle from the values of armature currents and field current flowing in the synchronous machine taking into consideration magnetic fluxes produced by the permanent magnets. The divider produces an armature current command by dividing a torque command by the armature flux linkage. The field current command generator calculates a field current command from the flux command and the phase of the armature flux linkage taking into consideration the magnetic fluxes produced by the permanent magnets. The armature current controller controls the synchronous machine in such a way that both an error of an armature current in a direction perpendicular to the direction of the armature flux linkage from the armature current command and an armature current in the direction of the armature flux linkage become zeros.

The control device thus structured can also control the wound field synchronous machine under optimum conditions reflecting changes in machine characteristics with ease even when any of the characteristics of the wound field synchronous machine vary.

What is claimed is:

1. A control device for controlling a wound field synchronous machine having a field coil and permanent magnets for generating magnetic fields, said control device comprising:
    a flux command generator for producing a flux command based on an input turning speed of the synchronous machine;
    an armature flux linkage calculator for calculating the magnitude and phase of armature flux linkage and power angle from the values of armature currents and field current flowing in the synchronous machine taking into consideration magnetic fluxes produced by the permanent magnets;
    a divider for producing an armature current command by dividing a torque command by the armature flux linkage;
    a field current command calculator for calculating a field current command based on an error of the armature flux linkage calculated by said armature flux linkage calculator from the flux command and the power angle; and
    an armature current controller for controlling the synchronous machine in such a way that both an error of an armature current in a direction perpendicular to the direction of the armature flux linkage from the armature current command and an armature current in the direction of the armature flux linkage become zeros.

2. The wound field synchronous machine control device according to claim 1, wherein said armature flux linkage calculator calculates the magnitude and phase of the armature flux linkage based on characteristics of each particular wound field synchronous machine, and said field current command calculator calculates the field current command based on the characteristics of each particular wound field synchronous machine.

3. A control device for controlling a wound field synchronous machine having a field coil and permanent magnets for generating magnetic fields, said control device comprising:
- a flux command generator for producing a flux command based on an input turning speed of the synchronous machine;
- a divider for producing an armature current command by dividing a torque command by the value of the flux command;
- a power angle calculator for calculating power angle from the flux command and the armature current command;
- a field current command generator for calculating a field current command from the flux command and the power angle taking into consideration magnetic fluxes produced by the permanent magnets;
- an adder for calculating the phase of the flux command by adding the power angle to rotor phase; and
- an armature current controller for controlling the synchronous machine in such a way that both an error of an armature current in a direction perpendicular to the direction of the flux command from the armature current command and an armature current in the direction of the armature flux linkage become zeros.

4. The wound field synchronous machine control device according to claim 3, wherein said power angle calculator calculates the power angle based on characteristics of each particular wound field synchronous machine, and said field current command generator calculates the field current command based on the characteristics of each particular wound field synchronous machine.

5. A control device for controlling a wound field synchronous machine having a field coil and permanent magnets for generating magnetic fields, said control device comprising:
- a flux command generator for producing a flux command based on an input turning speed of the synchronous machine;
- an armature flux linkage calculator for calculating the magnitude and phase of armature flux linkage and power angle from the values of armature currents and field current flowing in the synchronous machine taking into consideration magnetic fluxes produced by the permanent magnets;
- a divider for producing an armature current command by dividing a torque command by the armature flux linkage;
- a field current command generator for calculating a field current command from the flux command and the phase of the armature flux linkage taking into consideration the magnetic fluxes produced by the permanent magnets; and
- an armature current controller for controlling the synchronous machine in such a way that both an error of an armature current in a direction perpendicular to the direction of the armature flux linkage from the armature current command and an armature current in the direction of the armature flux linkage become zeros.

* * * * *